US007607975B2

(12) United States Patent
Sato et al.

(10) Patent No.: US 7,607,975 B2
(45) Date of Patent: Oct. 27, 2009

(54) BET CONTROL METHOD FOR RACE GAME

(75) Inventors: Naoyuki Sato, Tokyo (JP); Kenji Uchida, Tokyo (JP); Masanori Tsuchimoto, Tokyo (JP); Masashi Sakamoto, Tokyo (JP)

(73) Assignee: Sega Corporation, Tokyo (JP)

( * ) Notice: Subject to any disclaimer, the term of this patent is extended or adjusted under 35 U.S.C. 154(b) by 157 days.

(21) Appl. No.: 10/197,553

(22) Filed: Jul. 18, 2002

(65) Prior Publication Data

US 2003/0054870 A1 Mar. 20, 2003

Related U.S. Application Data

(63) Continuation-in-part of application No. 10/180,026, filed on Jun. 27, 2002, now abandoned.

(30) Foreign Application Priority Data

Jul. 19, 2001 (JP) ............................ 2001-220748

(51) Int. Cl.
*G06F 17/00* (2006.01)

(52) U.S. Cl. .......................................................... 463/6

(58) Field of Classification Search ..................... 463/6, 463/16–20

See application file for complete search history.

(56) References Cited

U.S. PATENT DOCUMENTS

| | | | | | |
|---|---|---|---|---|---|
| 3,645,531 | A | * | 2/1972 | Wright | 463/17 |
| 4,527,798 | A | * | 7/1985 | Siekierski et al. | 463/17 |
| 5,042,818 | A | * | 8/1991 | Weingardt | 463/13 |
| 5,564,701 | A | * | 10/1996 | Dettor | 463/16 |
| 5,830,068 | A | * | 11/1998 | Brenner et al. | 463/42 |
| 5,957,775 | A | * | 9/1999 | Cherry | 463/16 |
| 6,099,409 | A | | 8/2000 | Brenner et al. | |
| 6,358,150 | B1 | * | 3/2002 | Mir et al. | 463/28 |
| 6,450,887 | B1 | * | 9/2002 | Mir et al. | 463/42 |
| 6,676,514 | B1 | * | 1/2004 | Kusuda et al. | 463/24 |
| 2002/0010024 | A1 | * | 1/2002 | Kusuda | 463/42 |
| 2002/0037762 | A1 | * | 3/2002 | Wood et al. | 463/13 |
| 2002/0065120 | A1 | * | 5/2002 | Lee | 463/6 |
| 2003/0087683 | A1 | * | 5/2003 | Gatto et al. | 463/6 |

FOREIGN PATENT DOCUMENTS

| | | | | |
|---|---|---|---|---|
| EP | 1 125 606 | A2 | | 8/2001 |
| EP | 1 191 492 | A2 | | 3/2002 |
| WO | WO 00/67215 | A1 | | 11/2000 |
| WO | WO 0067215 | A1 | * | 11/2000 |
| WO | WO 00/77752 | A2 | | 12/2000 |
| WO | WO 02/11085 | A2 | | 2/2002 |

* cited by examiner

*Primary Examiner*—Ronald Laneau
*Assistant Examiner*—Tramar Harper
(74) *Attorney, Agent, or Firm*—Dickstein Shapiro LLP

(57) ABSTRACT

When a racing form speculating a race is selected, a bet is automatically made on a speculated possible finish place. A racing form speculated information indication region K1 is provided on the right side of a speculation indication region H5. A speculation racing form indication region K2 is provided on the right side of the racing form speculated information indication region K1. A game player selects a racing form to be used as speculated information. When an all bets button K5 below a racing form release button K4, bets are made maximum 8 sets of horse number combinations speculated by the racing forms. The bet control method can permit game players to easily and quickly bet.

8 Claims, 13 Drawing Sheets

BET CONTROL METHOD FOR RACE GAME

This application is a continuation-in-part of application Ser. No. 10/180,026, filed Jun. 27, 2002, now abandoned the entire disclosure of which is incorporated herein by reference.

BACKGROUND OF THE INVENTION

The present invention relates to a bet control method for a race game in which a plurality of running objects compete.

Among large-scaled game devices installed in game centers, etc., a horse race game device which has miniature race tracks at the center thereof in which miniature racehorses actually race is known. Owing to the development of the computer graphic technique, another horse race game device displays horse races on the large monitor screen.

Such horse race game devices are stably popular, because they give the pleasure of speculating winning horses, based on given information, and besides, during the races, the game players can cheer the racehorses they have betted, watching the races on the miniature race tracks and displayed on the monitor screens, which makes the races similar to real horse races. Recently, a game player can take part in the game as a horse owner who breeds his own race horse and enters it in races to earn prize moneys. This makes the games more popular.

In the conventional race game devices, the betting methods are the same as those of buying betting tickets in the actual horse races, and WIN (single-way bet), PLACE (each-way bet), QUINELLA (forecast bet), BRACKET QUINELLA (gate number forecast bet), QUINELLA PLACE (wider quinella), and so on, are prepared. As in the actual horse races, a racing form is prepared to provide the game players information for speculating wins and losses of the race.

When a game player bets, as in the actual horse races, he decides by himself a kind of the betting tickets, a horse and a betting coin number with reference to speculations of a racing form, and selects them on the touch panel to input them. In the horse race games, in which a betting time for one race is not long, a game player must make and select the decision in a short time.

This makes it difficult for a game player to bet, and besides the player must make the decision in a short time, which has been a barrier to the game players continuously playing in such games.

SUMMARY OF THE INVENTION

An object of the present invention is to provide a bet control method which enables a game player to easily and quickly bet on a race in which a plurality of running objects compete.

The above-described object is achieved by a bet control method for a race game in which a game player bets on a race in which a plurality of running objects race, and the game player obtains a share, based on a result of the race, the bet control method comprising the steps of: setting speculation information including a plurality of finish place possibilities in the race; presenting the speculation information to the game player; determining the speculation information in accordance with a command of the game player; and betting at once on a plurality of finish place possibilities included in the determined speculation information.

In the above-described bet control method for a race game, it is possible that in the step of setting the speculation information, the plurality of speculation information including the plurality of finish place possibilities in the race are set; in the step of presenting the speculation information, the plurality of speculation information are presented to the game player; and in the step of determining the speculation information, the game player commands one of the plurality of speculation information to thereby select and determine said one speculation information.

The above-described object is achieved by a bet control method for a race game in which a game player bets on a race in which a plurality of running objects race, and the game player obtains a share, based on a result of the race, the bet control method comprising the steps of: setting odds for a plurality of finish place possibilities in the race;

presenting the odds to the game player; determining a target share amount in accordance with a command of the game player; and determining a bet amount so that a share amount can reach the target share amount, based on the odds for the finish place possibility commanded by the game player.

The above-described object is achieved by a bet control method for a race game in which a game player bets on a race in which a plurality of running objects race, and the game player obtains a share, based on a result of the race, the bet control method comprising the steps of: setting odds for a plurality of finish place possibilities in the race; presenting the odds to the game player; determining desired odds in accordance with a command of the game player; and betting at once on the plurality of finish place possibilities for the desired odds commanded by the game player.

The above-described object is achieved by a bet control method for a race game in which a game player bets on a race in which a plurality of running objects race, and the game player obtains a share, based on a result of the race, the bet control method comprising the steps of: computing hits, based on statistics of results of past races; presenting the hits to the game player; selecting a desired hit in accordance with a command of the game player; and betting at once on the plurality of finish place possibilities based on the desired hit.

In the above-described bet control method for a race game, it is possible that in the step of presenting the hits to the game player, a hit of a highest occurrence rate or a hit of a lowest occurrence is presented to the game player.

The above-described object is achieved by a bet control method for a race game in which a game player bets on a race in which a plurality of running objects race, and the game player obtains a share, based on a result of the race, the bet control method comprising the steps of: storing a share amount in a past race; and increasing a maximum betted coin number which the game player can bet, in accordance with the share amount in the past race.

In the above-described bet control method for a race game, it is possible that the bet control method further comprises the steps of: judging whether or not the bet can be made by using betting coins owned by the game player; and commanding the game player to add betting coins when the bet is impossible.

According to the present invention, speculation information which permits game players to speculate a plurality of possibilities of finish wins of a race is provided, and bets are made, based on the speculation information, whereby the game players can quickly and easily bet.

DETAILED DESCRIPTION OF THE INVENTION

ONE EMBODIMENT

A horse race game device according to one embodiment of the present invention will be explained with reference to FIGS. 1 to 8.

(Constitution of the Horse Race Game System)

Figure 1:
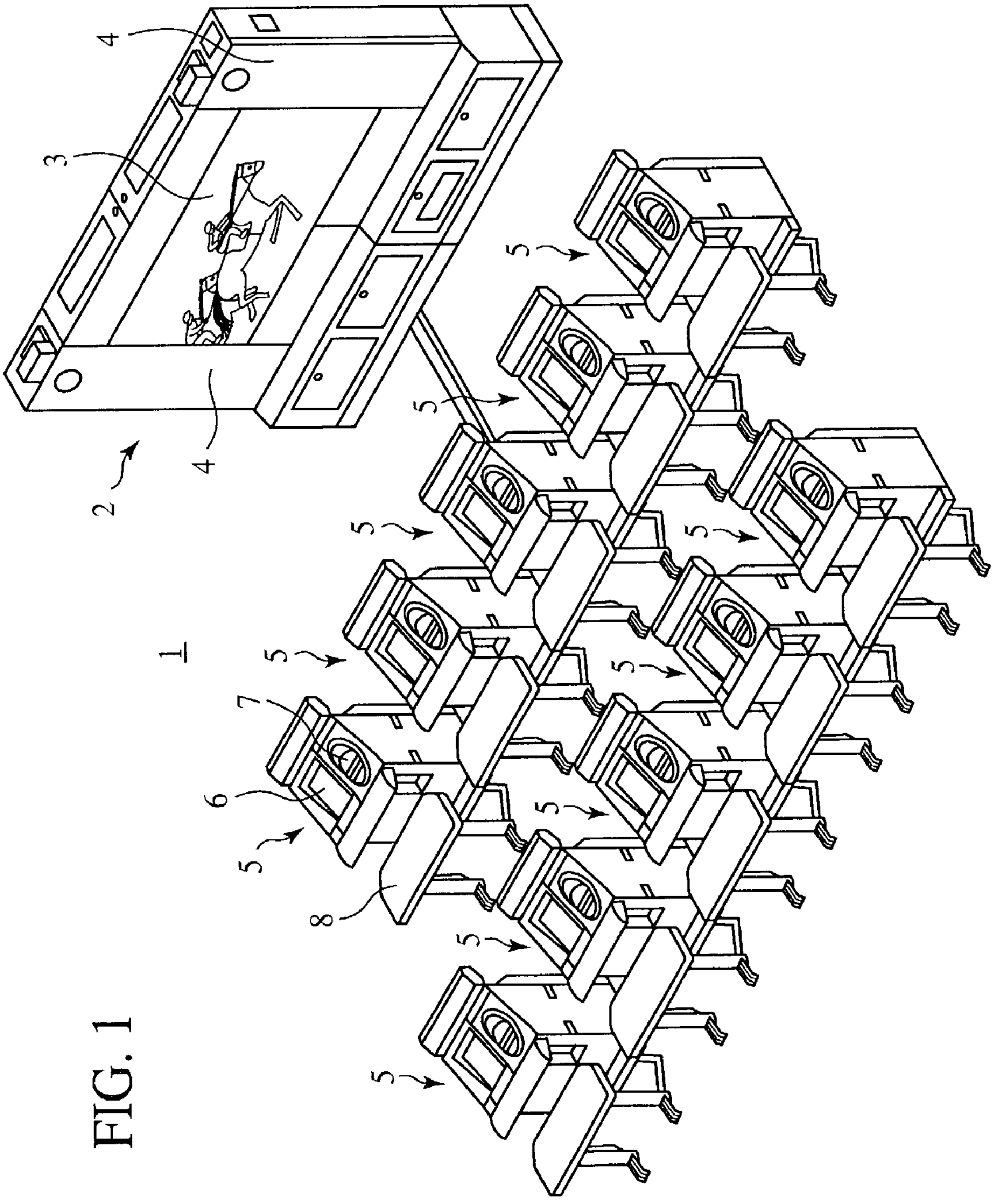
FIG. 1 is an appearance view of the horse race game device according to one embodiment of the present invention.
Figure 2:
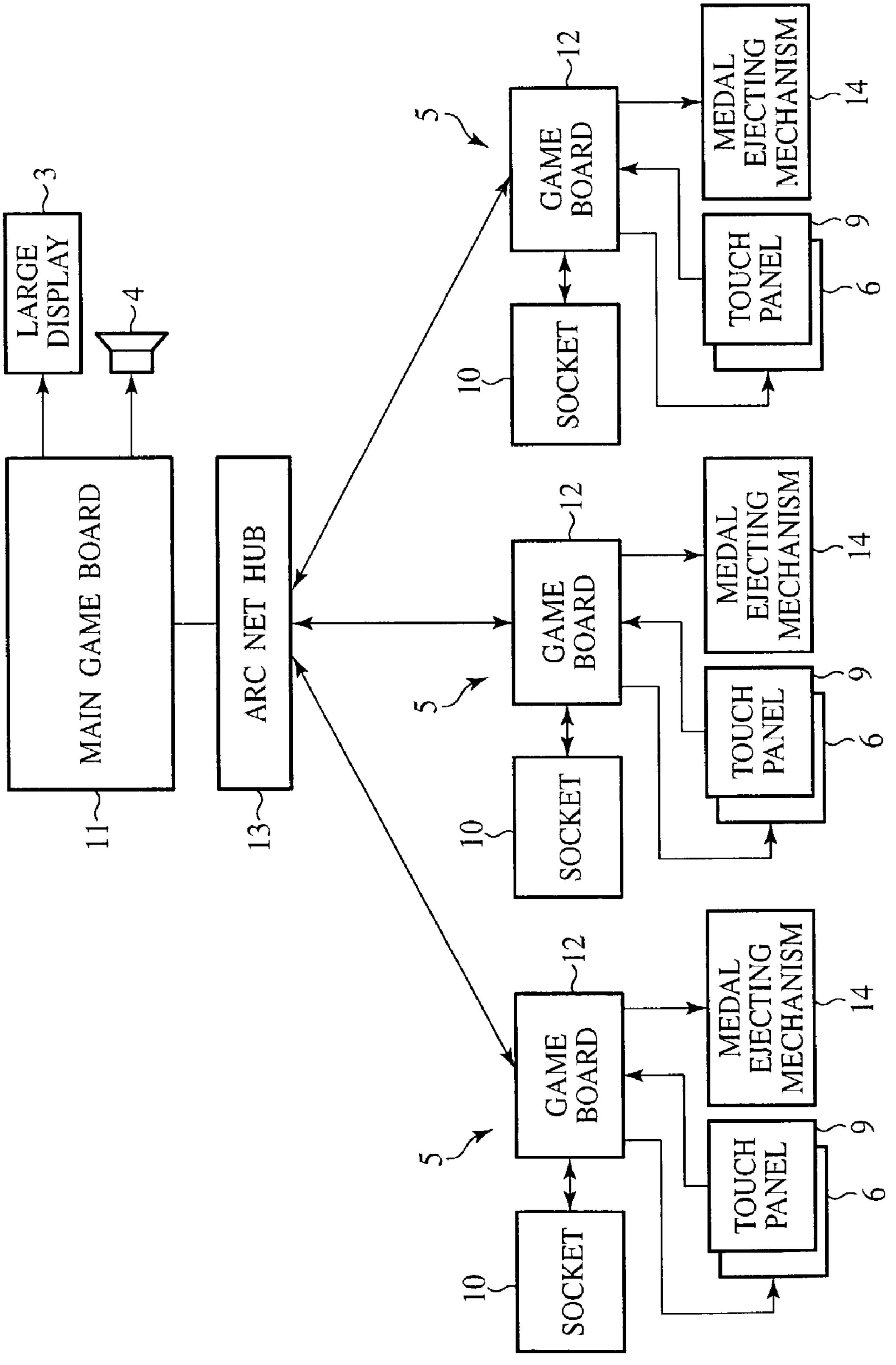
FIG. 2 is a block diagram of the horse race game device according to the embodiment of the present invention.

The horse race game device according to the present embodiment will be explained with reference to FIGS. 1 and 2. FIG. 1 is an appearance view of the horse race game device according to the present embodiment. FIG. 2 is a block diagram of the horse race game device according to the present embodiment.

In the race game played on the race game device according to the present embodiment, the game players do not operate racehorses, but speculate finish places of the racehorses (running objects) which are controlled by a CPU, bet coins, and receive allotments based on a race result.

The horse race game device according to the present embodiment ejects a prescribed number of coins when a bet wins. The betting methods are as follows: WIN (single-way bet), PLACE (each-way bet), QUINELLA (forecast bet), BRACKET QUINELLA (gate number forecast bet), QUINELLA PLACE (wider quinella), and so on. Furthermore, racehorses owned by respective game players can take part in the race game, and prescribed numbers of coins are provided according to finish places of the racehorses. The race game is a horse race game device of the so-called racehorse owners type.

As shown in FIG. 1, a main body 2 of the horse race game device 1 according to the present embodiment includes a huge unitary display 3 which outputs game images common with the game players. The unitary display 3 displays images of race states of the racehorses. Speakers 4 which output sounds of the game are disposed on both sides of the main body 2.

A plurality of satellites 5 to be used respectively by the game players are disposed in front of the main body 2. Each satellite 5 includes an individual display 6 which outputs images of the game associated with the racehorse owned by the game player or a racehorse the game player bets, and a coin inlet-outlet opening 7 through which coins are betted, and coins corresponding to an allotment and a prize are ejected. Each satellite 5 includes a chair 8 for the game player to sit on.

As shown in FIG. 2, a touch panel 9 is disposed on the individual display 6. Each game player touches the touch panel 9 with the fingers to operate the game. For example, a command key is suitably displayed on the individual display 6 in accordance with a progress of the game, and the game player directly touches the part of the touch panel 9 on the command key, whereby the game player inputs various command signals to a game control circuit which will be described later.

The horse race game device according to the present embodiment comprises, as shown in FIG. 2, comprises a main game board 11, and the game boards 12 of respective satellites through an arc net hub 13. The main game board 11 mainly controls generally the horse race game device 1, and the game boards 12 make controls respectively for the game players of the respective satellites 5.

The large-sized display 3 and the speakers 4 are connected to the main game board 11. The main game board 11 outputs image signals to the large-sized display 3 and outputs sound signals to the speakers 4 to output game images and sounds.

The display 6, the touch panel 9 and a socket 10 are connected to the game board 12 of each satellite 5, and furthermore, a coin ejecting mechanism 14 is connected to the game board 12. The game board 12 drives the coin ejecting mechanism 14 to eject coins as allotments or prizes to the player.

Each satellite 5 includes the socket 10. A storage medium, such as a memory or others, and an outside equipment, such as a portable telephone or others, for example, can be loaded in the socket 10. When memory is loaded, the game player's own racehorse produced and bred here can be used as he is, e.g., in a domestic video game device and an arcade horse race game device, etc. which will be described later, and the game player's own racehorse produced and bred in other game apparatuses can be used as a racehorse owned by the game player also in the horse race game device 1 according to the present embodiment.

(Initial Information Display)

Figure 3:
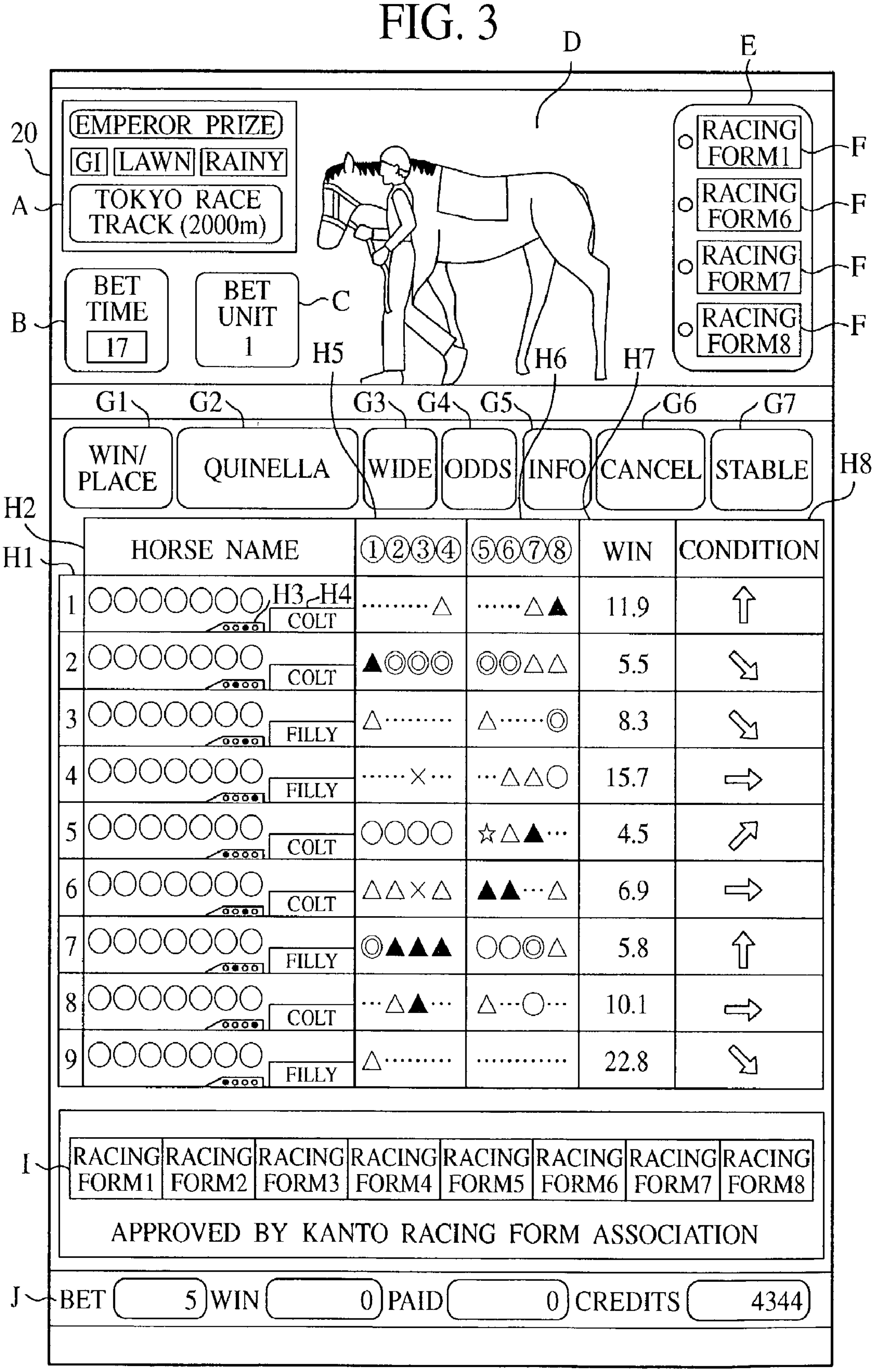
FIG. 3 is a view of an initial information image displayed on the respective displays of the horse race game devices according to the embodiment of the present invention.

FIG. 3 is an initial information display 20 displayed on the display 6 of each satellite 5. The initial information display 20 is a display of the satellite in the initial state. It imitates the design of a page of the racing form.

In a race information indication region A at the uppermost left part of the information display 20, a race name (Emperor Prize), a race grade (GI), a ground state (lawn), weather (rainy), a race ground (Tokyo Race Ground), a distance (2000 meters) are displayed.

In a betting time indication region B at the upper left part of the information display 20, a remaining betting time is displayed. On the right side of the betting time region B, a bet unit changing button C for changing a bet unit is displayed. The bet unit changing button C is touched to change a bet unit from 1->2->5->10->1->2 . . . .

In a horse information indication region D at the upper central part of the information display 20, a condition of a selected horse in the paddock, a selected horse name, a horse weight increase and decrease, etc. (○○○○○○○○) and an odds (WIN 1.8 times) of a race are displayed.

In a racing form name indication region E at an upper right part of the information display 20, a plurality of racing form selecting buttons F indicating racing form names are displayed. The racing form selecting buttons F are for changing racing forms.

At an upper central part of the information display 30, various buttons G1-G7 are disposed transversely of the information display 20. From the left to the right, a win/place indication button G1, a quinella/bracket quinella indication button G2, a quinella place indication button G3, an odds indication button G4, an information indication button G5, a cancel button G6 and a stable indication button G7 are arranged.

In a race detailed information indication region H of the information display 20 below the various buttons G1-G7, detailed information of respective horses to race in the current race (horse names, racing manners, jockeys, speculation, previous race achievements, win odds, conditions), etc. are displayed.

In a number indication region H1, horse numbers are displayed. In a horse name indication region H2, horse names are displayed. In a racing manner indication region H3 in the horse name indication region H2, racing styles (NIGE (lead at the early pace and finish in the lead), SENKO (run second or third just behind the leading horse and catch up around the 4th corner to lead), SASHI (run behind the middle, accelerate around the 4th corner to catch), OIKOMI (run behind and catch up in the stretch) are displayed. In a horse kind indication region H4, horse kinds (colt, filly, gelding) are displayed.

In speculation indication regions H5, H6 on the right side of the horse name indication region H2, speculations by the respective racing forms are indicated by ◎, ○, ▲, Δ, ☆, X, etc. In the present embodiment, the speculation information provided by eight racing forms, or a racing form 1, a racing form 2, . . . , a racing form 8 are displayed in the speculation indication regions H5, H6.

In an odds indication region H7 on the right side of the speculation indication region H6, win odds for the respective horses are displayed. In a condition indication region H8 on the right side of the odds indication region H7, the current conditions of the respective horses are indicated by directions of arrows.

An approval indication region I is provided as required below the rage detailed information indication region H. In the approval indication region I, it is indicated that the various information provided on the information display 20 is approved by the association of the racing forms.

In a current state indication region J in a lowermost part of the information display 20, current states (BET, WIN, PAID, CREDITS) are transversely displayed. As the current states, a betted coin number (BET), a won coin number (WIN), a paid coin number (PAID) and an accumulated coin number (CREDITS) are displayed.

(Racing Form Bet)

Figure 4:
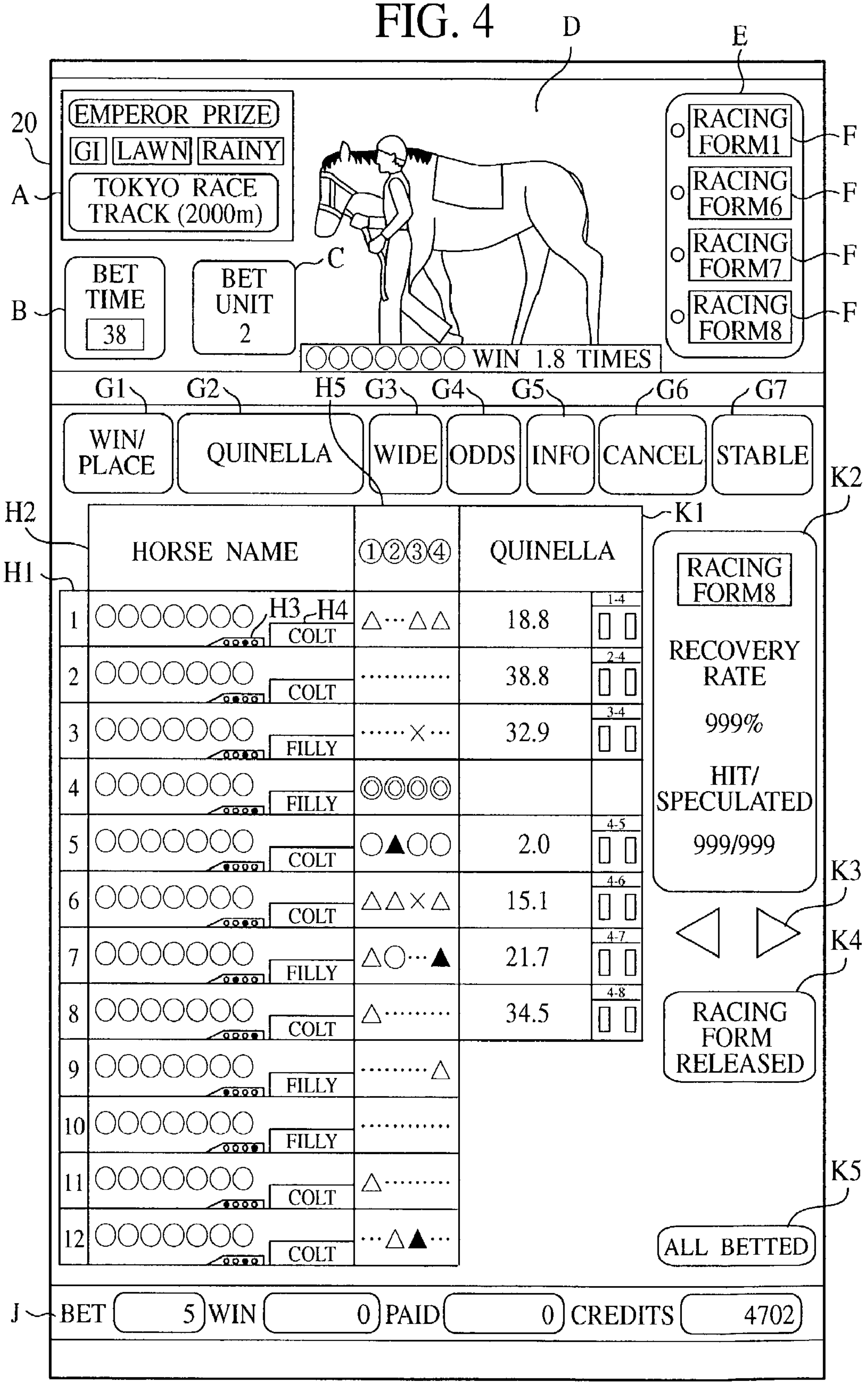
FIG. 4 is a view of an information image, when a racing form bet mode is selected, displayed on the respective displays of the horse race game devices according to the embodiment of the present invention.

As one example of the bet control method in the horse race betting system according to the present embodiment, a racing form bet will be explained with reference to FIG. 4. FIG. 4 is the information display 20 presented on the display 6 of the satellite 5 when the racing form betting is made.

In the racing form bet, racing forms speculating a race are selected, whereby bets can be automatically made in accordance with the speculations of the racing forms. Conventionally, speculated information has been provided by racing forms, but actual bets have been made by a game player making commands while watching the racing forms. According to the present example, a game player may command only racing forms, which enables a beginner game player to make a suitable bet in short periods of time.

Indications for making the racing form are presented by using the speculation indication region H6, the odds indication region H7 and the condition indication region H8 of the initial information display 20 shown in FIG. 3.

A racing form speculated information indication region K1 is provided on the right side of the speculation indication region H5, and a speculation racing form indication region K2 is provided on the right side of the racing form speculated information indication region K1. In the speculation racing form indication region K2, speculated racing forms (Racing form 8), a recovery percentage (99.9%) and a hit rate (100%) are indicated. In the racing form speculated information K1, speculate QUINELLAs (1-4, 2-4, 3-4, 4-5, 4-6, 4-7, 4-8) of the race depending on Racing form 8 ), and odds of QUINELLAs (18.8, 38.8, 32.9, 2.0, 15.1, 21.7, 34.5) are indicated.

Recommendable buys are decided for each racing form, based on speculation marks. For example, when speculation marks ◎ (odds-on), ○ (rival), ▲ (single dark horse), Δ (dark horse 1), ☆ (dark horse 2), X (dark horse 3) are decided, ◎-○, ◎-▲, ○-▲, ◎-Δ, ◎-☆, ◎-X are recommendable buys. The game players select one from the racing forms, whereby recommendable buys can be automatically commanded.

An arrow-shaped button K3 is displayed below the speculation racing form indication region K2. The arrow-shaped button K3 is touched to change the speculated racing forms, e.g., from Racing form 1->Racing form 2->Racing form 3 ->Racing form 4->Racing form 5->Racing Form 6->Racing Form 7->Racing Form 8->Racing Form 1→. . . .

A racing form release button K4 is displayed below the arrow-shaped button K3. When the racing form release button K4 is touched, the racing form bet mode is released. The speculated racing form which has been selected at the time when the racing form bet mode is released is stored, and, when the speculated betting mode is selected, the speculated racing form is first indicated in the next racing form mode.

A all betted button K5 is displayed below the racing form release button K4. The game player only touches the all betted button k5, whereby he can bet at once all possible quinellas, at most 8 quinellas, speculated by the racing form 8.

When the all bets button K5 and desired speculated regions of the racing form speculated information indication region K1 are touched, the betted coin numbers can be respectively increased or decreased.

Figure 5:
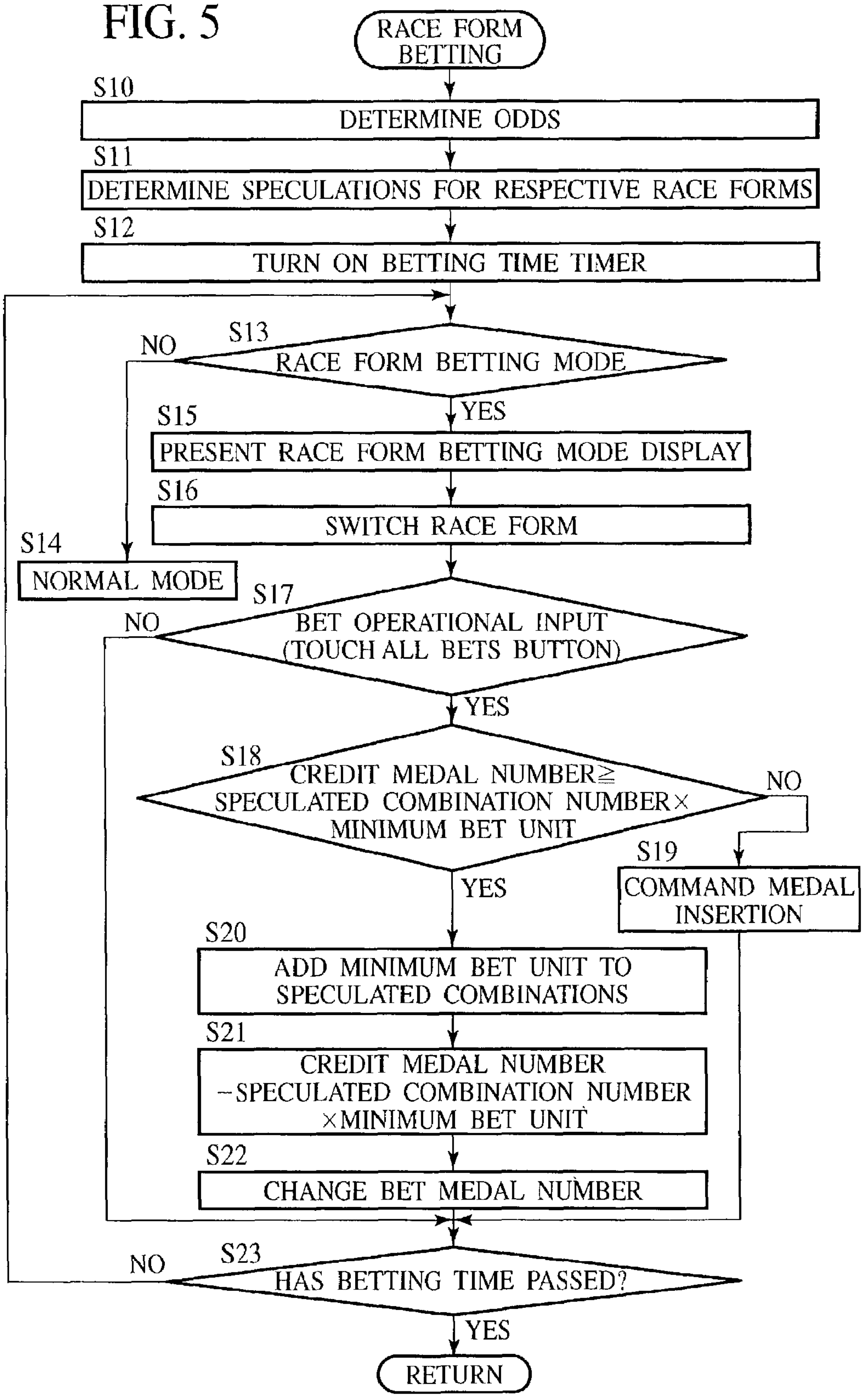
FIG. 5 is a flow chart of the bet control method for the racing form bet mode.

The bet control method for the racing form bet according to the present example will be detailed with reference to the flow chart shown in FIG. 5.

First, a prescribed computation is made to determine odds for a race to be held (Step S10). Then, race speculations are made for respective racing forms to determine favorites, rivals, dark horses, etc., and buys are determined based on the speculations (Step S11).

Then, a betting time timer with a prescribed betting time set is turned on to start betting (Step S12).

Next, a player determines whether or not he will select the racing form bet (Step S13). When he does not select the bet form mode, the normal mode takes place (Step S14).

In the racing form bet, the racing form bet mode display as shown in FIG. 4 is presented (Step S15). In the racing form bet mode display, speculation information of the racing form is displayed in the racing form speculation information indication region K1 and the speculation racing form display region K2 on the right side of the speculation display region H5.

Speculation information of the racing form is displayed. The player touches the arrow-shaped button K3 to thereby switch the racing form (Step S16).

Then, a bet operational input by the player is waited for (Step S17). The player touches the all bets button K5 to thereby make the bet operation input. When no bet operational input is made, Step S23 follows.

When the bet operational input is made, it means that bets have been made on all quinellas speculated by the racing form. It is checked whether or not such bets are possible; it is judged whether or not a coin number of a credit owned by the player is above a coin number given by multiplying a number of all the speculated combinations by a minimum bet unit (e.g., 2 coins) (Step S18). When the coin number of the credit owned by the player is short, the player is commanded to insert additional coins (Step S19).

When the coin number of the credit owned by the player is sufficient, the minimum bet unit is added to all the speculated combinations (Step S20), the betted coin number is subtracted from the credit coin number (Step S21) to change a bet coin number indication (Step S22).

Then, it is judged whether the prescribed betting time has passed (Step S23), and unless the betting time has passed, Step S13 follows.

According to the racing form bet according to the present example, when a racing form speculating a race is selected, possible combinations, for example, 1-4, 2-4, etc., speculated by the racing form are displayed on the display. The game player only pushes one button, whereby he can bet at once on all possible combinations of finish places presented on the display. Conventionally, a game player has considered by himself combinations, based on speculations of the racing forms and made bets by pushing buttons one by one in accordance with his decided combinations of possible finish places, e.g., 1-4, 2-4, etc. Beginner game players, who are not accustomed to considering combinations of horses, have found it difficult to bet desired combinations of horses, based on speculations of the racing forms. In the present example, racing forms are commanded, whereby possible combinations of finish places of horses are decided and displayed, whereby game players can bet at once respective combinations of finish places, which permits even beginner game players to easily play the game.

(Target Coin Number Commanding Bet)

The target coin number commanding bet will be explained as one example of the bet control method for the horse race game device according to the present embodiment will be explained with reference to FIG. 5. FIG. 5 shows an information display 20 presented on the displays 6 of the respective satellites 5.

In the target coin number commanding bet, when a game player commands a target coin number, a suitable number is automatically betted, based on the target coin number and an odds. When a target coin number is 100, five are betted for a 20 times odds, and one is betted for a 100 times odds. Conventionally, a game player has viewed odds in consideration of target coin numbers and manually calculated numbers to be betted for the respective target coin numbers. According to the present example, target coin numbers alone may be commanded, which permits even beginner game players to make suitable bets in short periods of time.

By using the speculation indication region H6, the odds indication region H7 and the condition indication region H8 in the race detailed information indication region of the initial information display 20 shown in FIG. 3, indications are made for the target coin number commanding bets.

On the right side of the speculation indication region H5 there is provided a racing form speculation information indication region K1 which is the same as that of the information display 20 shown in FIG. 4. In the racing form speculation indication region K1, a speculation of quinella horse numbers of a race by the racing forms, and odds of the quinella horse numbers are indicated.

A message indication region L1 is displayed on the right side of the racing form speculated information indication region K1. In the message indication region L1, a message indication region L1, a message "set a target coin number to bet" is indicated.

Below the message indication region L1, a target coin number setting button L2 is displayed. In the present example, 4 setting buttons, 100 coins, 200 coins, 500 coins and 1000 coins are displayed. A game player touches the target coin number setting button L2 to thereby set a target coin number.

An all bets button L3 is displayed below the target coin number setting button L2. The all bets button L3 is touched to automatically bet suitable numbers, based on the set target coin numbers and odds.

When both the all bets button L3 and a desired speculation region of the racing form speculated information display region K1 are touched, the betted coin numbers can be respectively increased and decreased.

An example of the procedures of the target coin number commanding bet according to the present example will be explained. A game player selects a horse as a main horse. For example, the game player speculates that Horse No. 4 will win at least the second place, he selects Horse No. 4. The CPU selects combinations determined by Horse No. 4 and indicates on the display. All combinations, e.g., 1-4, 2-4, 3-4, . . . , containing Horse No. 4, and their odds are indicated.

Then, the game player sets a target coin number. When he likes to get 100 coins, he selects the button "100" on the display or inputs 100 to the target coin number input region.

Then, the game player decides combinations he likes to bet, out of the selection indicated on the display, e.g., 1-4, 2-4, 3-4, . . . . The CPU computes betted coin numbers for all the combinations the game player has selected, and bets the numbers.

For example, if an odds for "1-4" is 20 times, when a game player selects "1-4" alone, the CPU computes to decide 5 coins, and subtracts 5 coins from a credit to bet.

For example, if an odds for "1-4" is 15 times, and an adds for "2-4" is 35 times, the button 1-4 and the button 2-4 are touched twice to select two combinations, "1-4" and "2-4".

Seven coins are betted on "1-4", and 3 coins are betted on "2-4". That is, a target coin number is divided by an adds to automatically decide a bet coins. When a target coin number is arithmetically undividable, a minimum coin number is decided to be above 100 coins.

The bet control method for the target coin number commanding bet according to the present example will be detailed with reference to the flow chart shown in FIG. 7.

First, a prescribed computation is made to determine odds for a race to be held (Step S30).

Then, a betting time timer with a prescribed betting time set is turned on to start betting (Step S31).

Next, a player determines whether or not he will select the target coin number commanding bet mode (Step S32). When he does not select the target coin number commanding bet mode, the normal mode takes place (Step S33).

Figure 6:
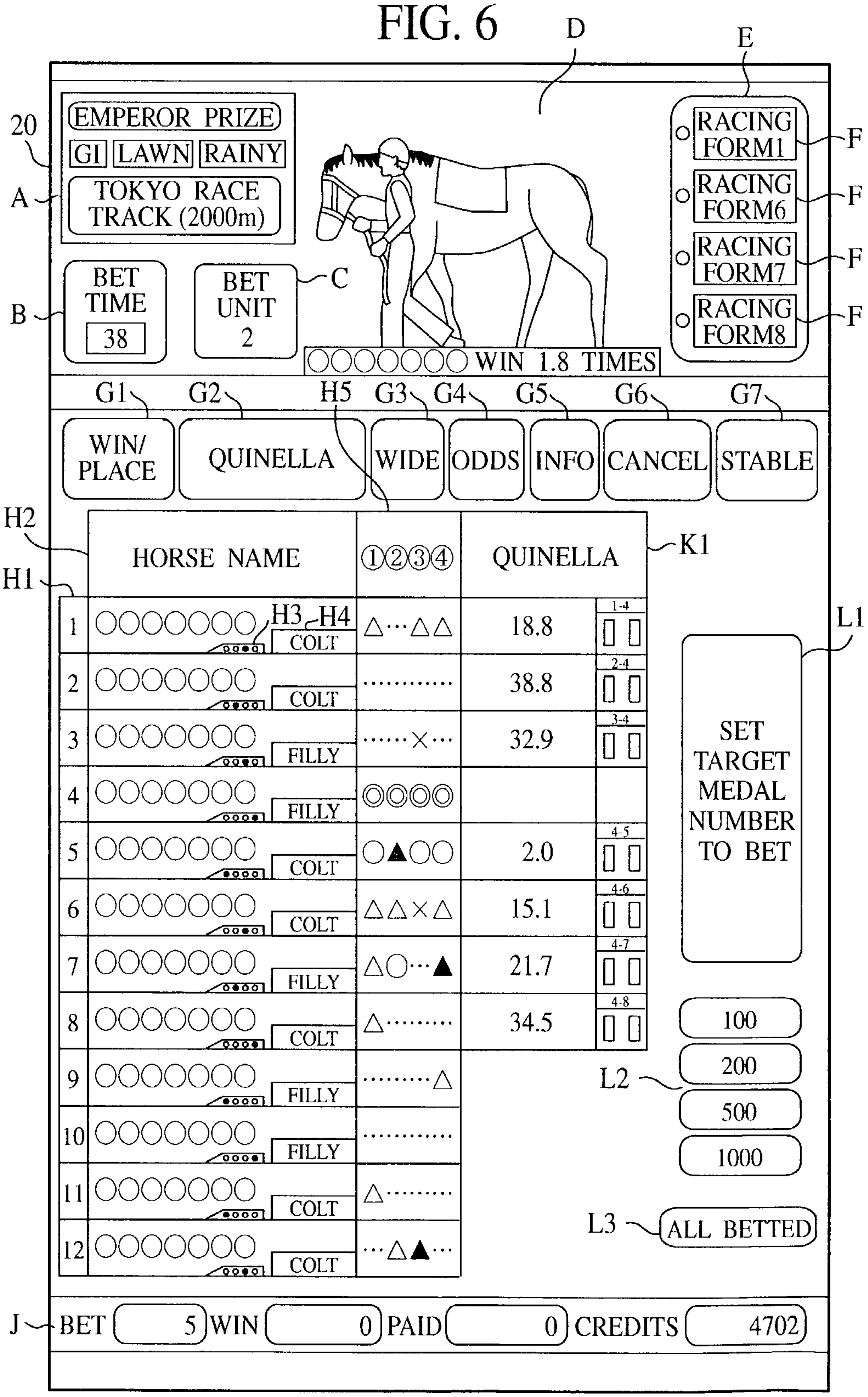
FIG. 6 is a view of an information image, when a target coin number commanding bet mode is selected, displayed on the respective displays of the horse race game devices according to the embodiment of the present invention.

In the target coin number commanding bet mode, the target coin number commanding bet mode shown in FIG. 6 is present on the screen (Step S34).

First, a player touches a horse number in the number indication region H1, or a horse name in the horse name indication region H2 to thereby select a horse number as an axis (Step S35). When the horse number as the axis is selected, as shown in FIG. 6, speculated quinellas with the axial horse number involved, and their odds are displayed in the racing form speculation information indication region K1. Guide information for the target coin number commanding bet is displayed in the message indication region L1, and number setting buttons are indicated in the target coin number setting buttons L2.

Then, a bet operational input by the player is waited for (Step S36). The player touches one of the target coin number setting buttons L2 to thereby make the bet operational input. When no bet operational input is made, Step S34 follows.

When the bet operational input is made, then the player selects a speculation (Step S37). A betted coin number is computed by dividing a target coin number by the selected speculated odds (Step S38).

Subsequently, it is checked whether or not the bet can be made on the selected speculation. It is judged whether or not a coin number of the credit owned by the player is above the betted coin number computed in Step S38 (Step S39). When the credit coin number owned by the player is short, the player is commanded to insert additional coins (Step S40).

When the credit coin number owned by the player is sufficient, the betted coin number computed for the speculation is added (Step S41). The betted coin number is subtracted from the credit coin number (Step S42), and the betted coin number indication is changed (Step S43).

It is judged whether or not the prescribed betting time has passed (Step S44), and when the betting time has not passed, Step S32 follows.

Figure 7:
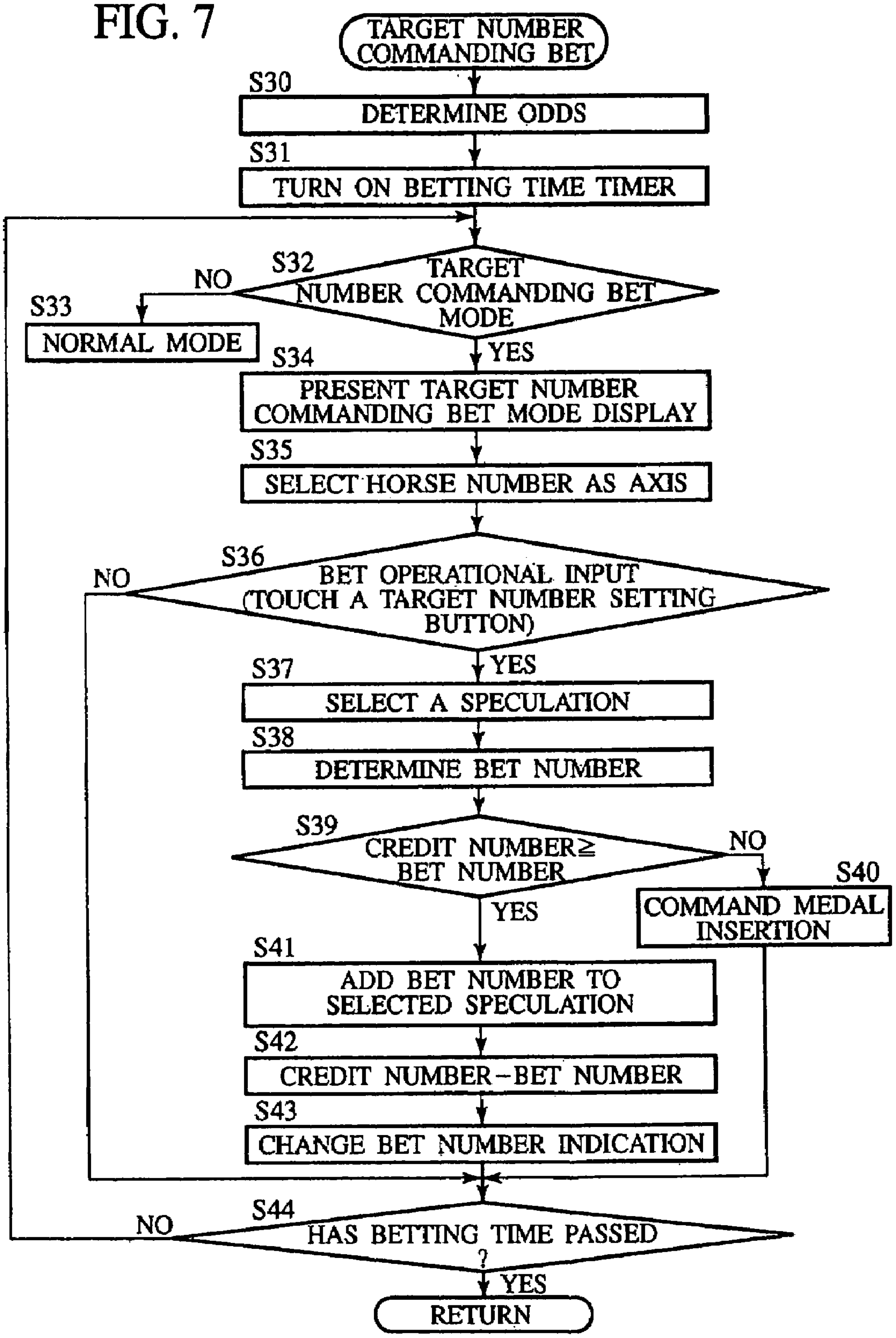
FIG. 7 is a flow chart of the bet control method for the target coin number commanding bet mode.

In place of selecting a specific speculation in Step S37 of the flow chart of FIG. 7, the all bet button L3 is touched, and bets in which the target coin number is betted on all the indicated speculations are made. In this case as well, it is judged whether or not the bets can be made on all the speculations, and when the credit coin number is short, the addition of coins is commanded.

(Odds Commanding Bet)

As one example of the bet control method for the horse race game device according to the present embodiment, odds commanding bet will be explained with reference to FIG. 6. FIG. 6 is an information image 20 displayed on the display 6 of the satellite 5 when the odds command bet is made.

In the odds commanding bet, when a game player commands his desired odds range, bets are automatically made on all odds in the range. Conventionally, a game player views odds to command respective odds. According to the present example, a game player may command his desired odd range alone, which permits even a beginner game player to make suitable bets in short periods of time.

By using the speculation indication region H6, the odds indication region H7 and the condition indication region H8 in the race detailed information indication region H of the initial information display 20 in FIG. 3, indications for the odds commanding bet are made.

On the right side of the speculation indication region H5 there is provided a racing form speculated information indication region K1 which is the same as in the information display 20 shown in FIG. 4. In the racing form speculation indication region K1, speculated quinella of a race by the racing forms and odds of the speculated quinella are indicated.

A message indication region M1 is displayed on the right side of the racing form speculated information indication region K1. In the message indication region M1, a message indication region M1, a message “set odds” is indicated.

Below the message indication region L1, an odds setting button M2 is displayed. In the present example, 4 setting buttons, “–10”, “10-20”, “20-30”, “30–” are displayed. A game player touches the odds setting button M2 to thereby set a target coin number.

For example, when a game player touches the button “–10”, all combinations of odds in the range may be indicated.

An all bets button M3 is displayed below the odds setting button M2. The all bets button M3 is touched to thereby automatically bet on all positions in a set odds range. The bet positions are touched to thereby increase and decrease the respective betted coin numbers.

Figure 9:
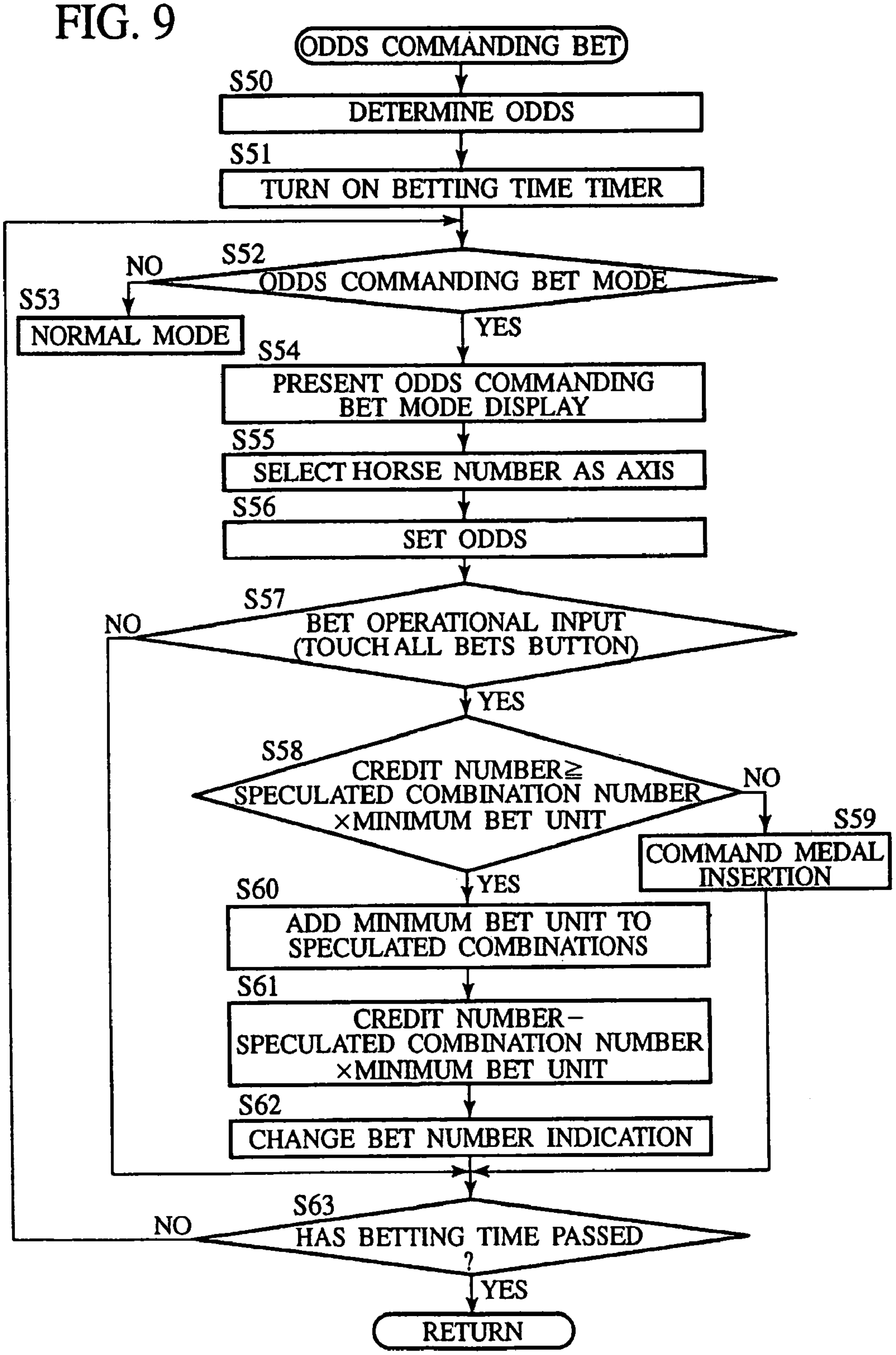
FIG. 9 is a flow chart of the bet control method for the odds commanding bet mode.

The bet control method for the odds commanding bet according to the present example will be detailed with reference to the flow chart of FIG. 9.

First, a prescribed computation is made to determine odds for a race to be held (Step S50).

Then, a betting time timer with a prescribed betting time set is turned on to start betting (Step S51).

Then, a player selects whether he will select the odds commanding bet mode (Step S52). When the player does not select the odds commanding bet mode, the normal mode takes place (Step S53).

Figure 8:
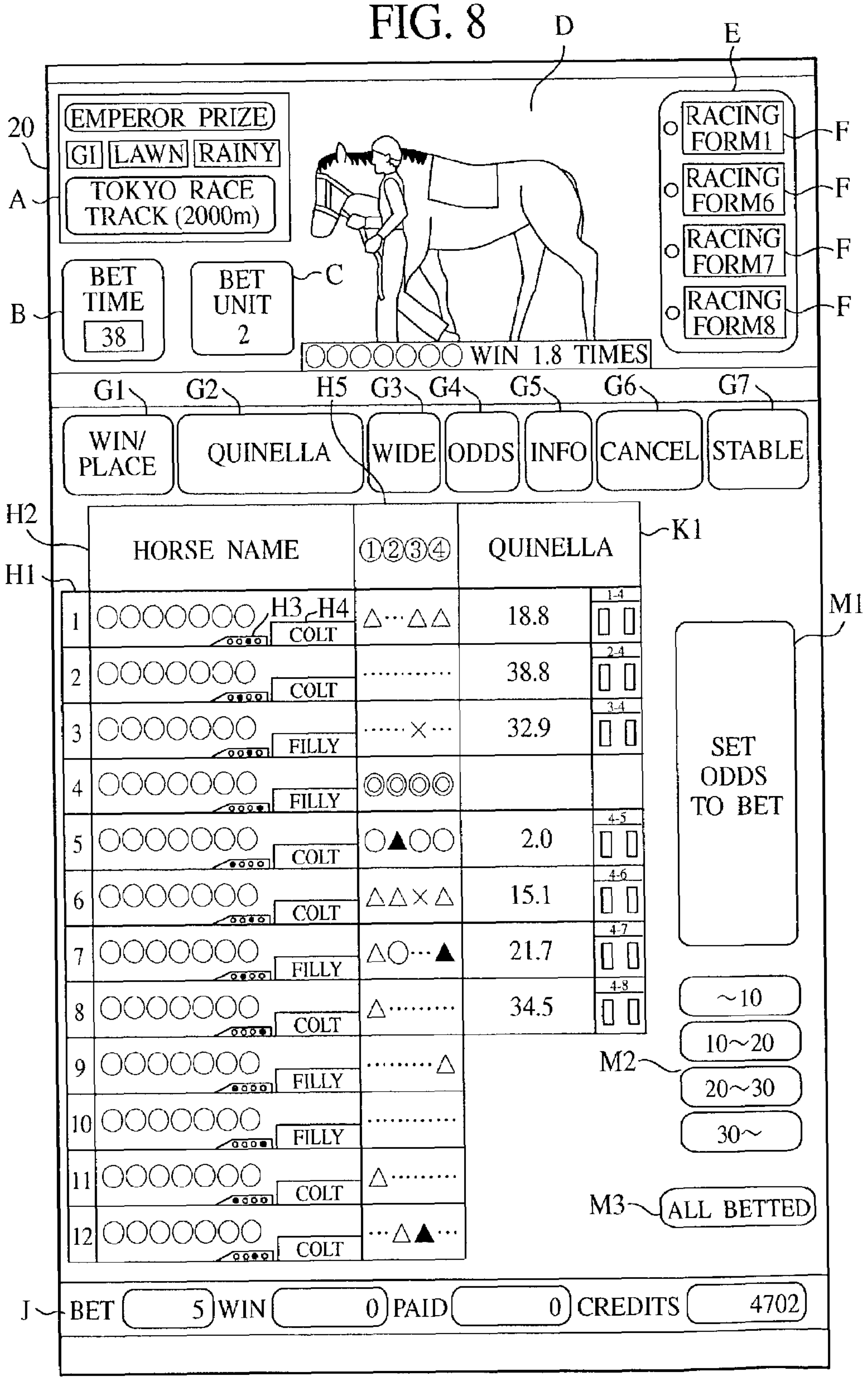
FIG. 8 is a view of an information image, when an odds commanding bet mode is selected, displayed on the respective displays of the horse race game devices according to the embodiment of the present invention.

In the odds commanding bet mode, the odds commanding bet mode display as shown in FIG. 8 is presented (Step S54).

First, a player touches the horse number in the number indication region H1, or a horse name in the horse name indication region H2 to thereby select a horse number as an axis (Step S55). When the horse number as the axis is selected, as shown in FIG. 8, speculated quinellas with the axial horse number involved, and their odds are indicated in the racing form speculation information indication region K1.

Guide information for the odds commanding bet is indicated in the message indication region M1, and odds setting buttons M2 are indicated. When the player touches one of the odds setting buttons M2, odds are commanded (Step S56). All speculations falling in the range of the commanded odds are indicated, and the rest speculations are not indicated.

It is also possible that the game player directly inputs values of odds to determine odds in an arbitrary range.

Then, a bet operational input by the player is waited for (Step S57). The player touches the all bets button M3 to thereby make the bet operational input. When the bet operational input is not made, Step S63 follows.

When the bet operational input is made, it is checked whether or not bets can be made on the selected speculations; it is judged whether or not a coin number of the credit owned by the player is above a coin number given by multiplying a number of all the indicated speculated combinations by 2 coins which is a minimum bet unit (Step S58). When the coin number of the credit owned by the player is short, additional insertion of coins by the player is commanded (Step S59).

When the coin number of the credit owned by the player is sufficient, the minimum bet unit is added to all the speculated combinations (Step S60) and subtracting the betted coin number from the credit coin number (Step S61), and a betted coin number indication is changed (Step S62).

Then, it is judged whether the prescribed betting time has passed (Step S63). When the prescribed betting time has not passed, Step S52 follows.

In the present example, a horse as an axis is selected, but it is possible to select all odds in an indicated range without selecting a horse as a axis.

(Hit Commanding Bet)

Figure 10:
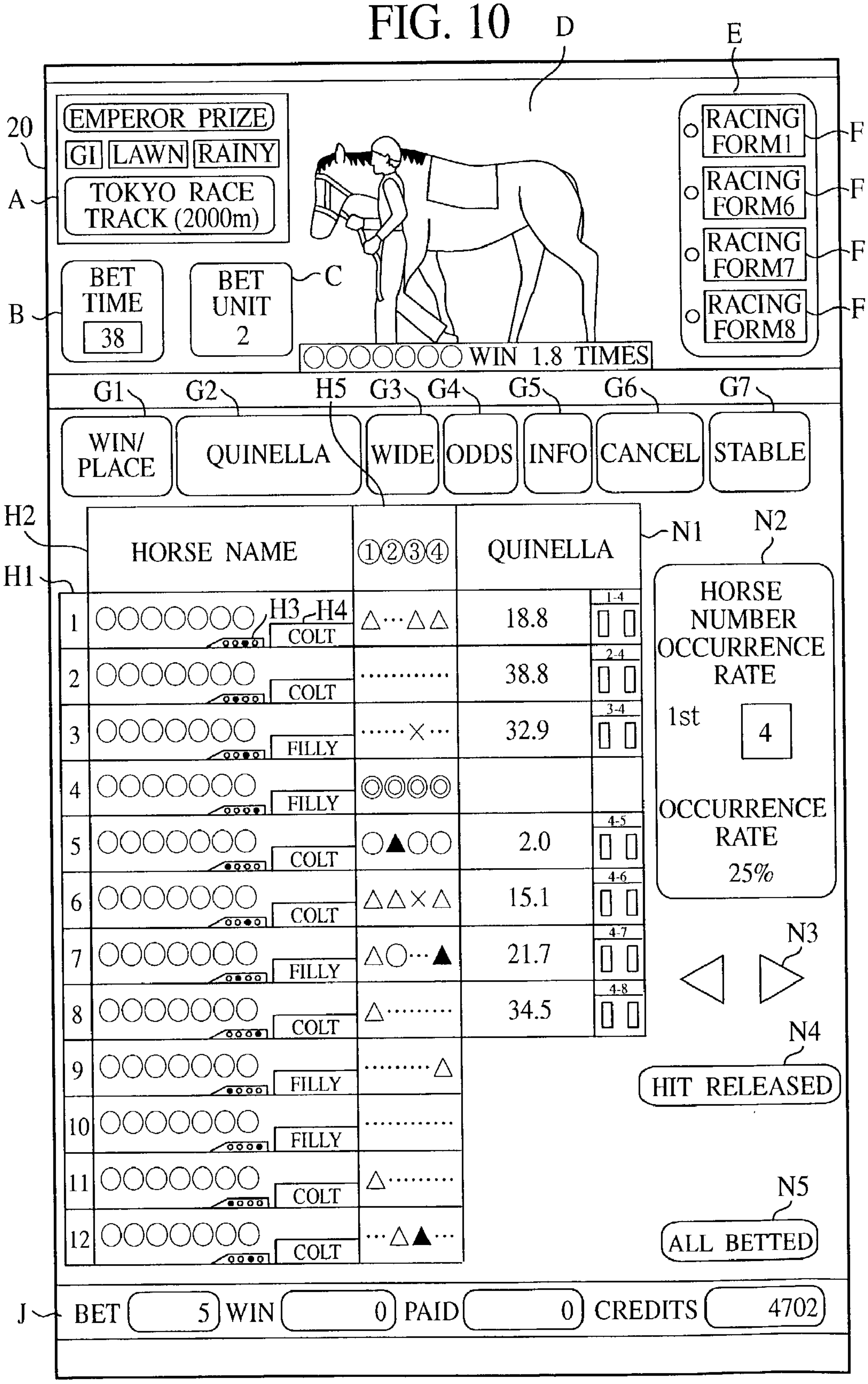
FIG. 10 is a view of an information image, when a hit commanding bet mode is selected, displayed on the respective displays of the horse race game devices according to the embodiment of the present invention.

As one example of the bet control method for the horse race game device according to the present embodiment, hit commanding bet will be explained with reference to FIG. 10. FIG. 10 is an information display 20 displayed on the display 6 of the satellite 5 when the hit commanding bet is made.

In the hit commanding bet, hits of horse numbers in arbitrary previous horse races are given and indicated, and a game player commands a hit number to thereby automatically bet in accordance with the hit number. Conventionally, a game player must manually sum up hits of horse numbers, and the summation has been actually impossible for race games. According to the present example, bets can be made based on hits of horse numbers.

By using the speculation indication region H6, the odds indication region H7 and the condition indication region H8 in the race detailed information indication region of the initial information display 20 shown in FIG. 7, indications are made for the hit commanding bets.

A speculation information indication region N1 is provided on the right side of a speculation indication region H5, and a hit indication region N2 is provided on the right side of the speculation information indication region N1. In the hit indication region N2, a place (the first place) of a horse number occurrence percentage, a horse number (4) and an occurrence percentage (25%) are indicated. In the speculated information indication region N1, information of double horse numbers which have the commanded hit (4) as the main horse and which have been sorted in the order of previous occurring hits is indicated.

A arrow-shaped button N3 is displayed below the hit indication region N2. The arrow-shaped button N3 is touched to change hits from, e.g., 1st place->2nd place->3rd place -> . . . ->1st place->2nd place->. . . . When a hit in the hit indication region N2 is selected, all finish place possibilities associated with the hit are indicated.

A hit release button N4 is displayed below the arrow-shaped button N3. When the hit release button N4 is touched, the hit command bet mode is released. A hit place which has been selected at the time when the hit commanding bet mode is released is stored, and the hit place is first indicated in the next hit commanding bet mode.

An all bets button N5 is displayed below the hit release button N4. When the all bets button N5 is touched, bets are made on all double horse numbers indicated in the speculation information display region N1.

When both the all bets button K5 and a desired speculated region of the speculation information indication region N1 are touched, betted coin numbers can be respectively increased and decreased.

Figure 11:
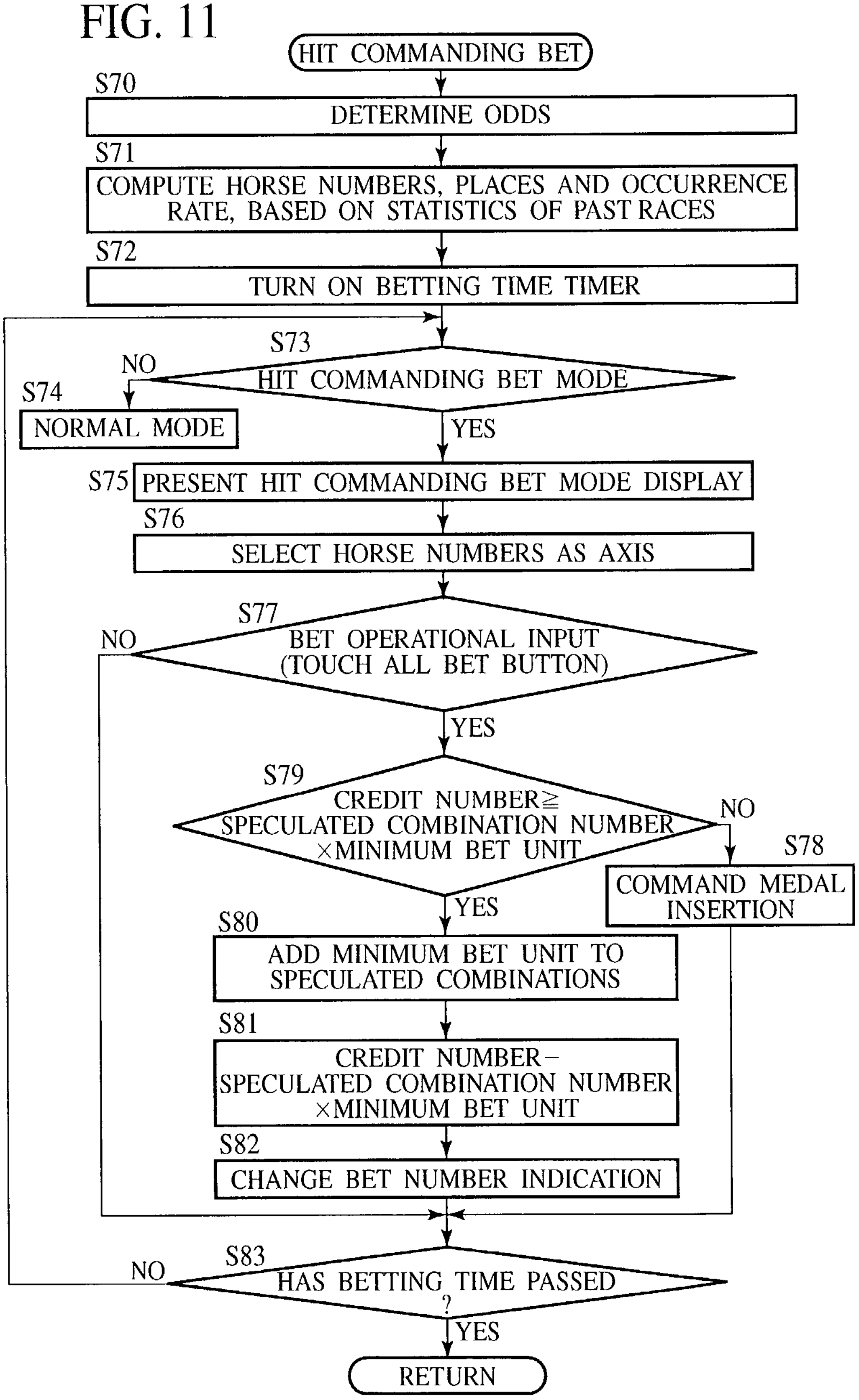
FIG. 11 is a flow chart of the bet control method for the hit commanding bet mode.

The bet control method for the hit commanding bet according to the present example will be explained with reference to the flow chart of FIG. 11.

First, a prescribed computation is made to determine odds for a race to be held (Step S70). Then, a "hit", as of horse numbers, places, occurrence rates or others is computed based on statistics of past races (Step S71).

Then, a betting time timer with a prescribed betting time set is turned on (Step S72).

Next, a player determines whether or not to select the hit commanding bet mode (Step S73). When the player does not select the hit commanding bet mode, the normal mode takes place (Step S74).

In the hit commanding bet mode, the hit commanding bet mode display as shown in FIG. 10 is presented (Step S75). The hit commanding bet mode display contains a speculation information indication region N1 and a hit indication region N2. In the hit indication region N2, places of the horse number occurrence rate and horse numbers, and occurrence rates are indicated. In the speculation information indication region N1, information of quinellas of a horse as an axis, which has been indicated as a hit, and of horses sorted in the order of the past occurrence rate are indicas82 follows.

The player touches the arrow-shaped button N3 to change the horse number as the axis.

Then, a bet operational input by the player is waited for (Step S76). The player touches the all bets button N5 to thereby make the bet operational input. When the bet operational input is not made, Step S82 follows.

When the bet operational input is made, it is checked whether or not bets can be made on the selected speculations; it is checked whether or not a coin number of the credit of the player is above a coin number given by multiplying a number of all indicated speculated combinations by a minimum bet unit, 2 coins (Step S77). When a coin number of the credit owned by the player is short, the player is commanded to input additional coins (Step S78).

When the coin number of the credit owned by the player is sufficient, the minimum coin number is added to all the speculated combinations (Step S79), subtracting betted coin numbers from the credit coin numbers (Step S80), and a betted coin number indication is changed (Step S811).

Then, it is judged whether or not the prescribed betting time has passed (Step S82), and unless the betting time has passed, Step S73 follows.

(Place Ride Bet)

Figure 12:
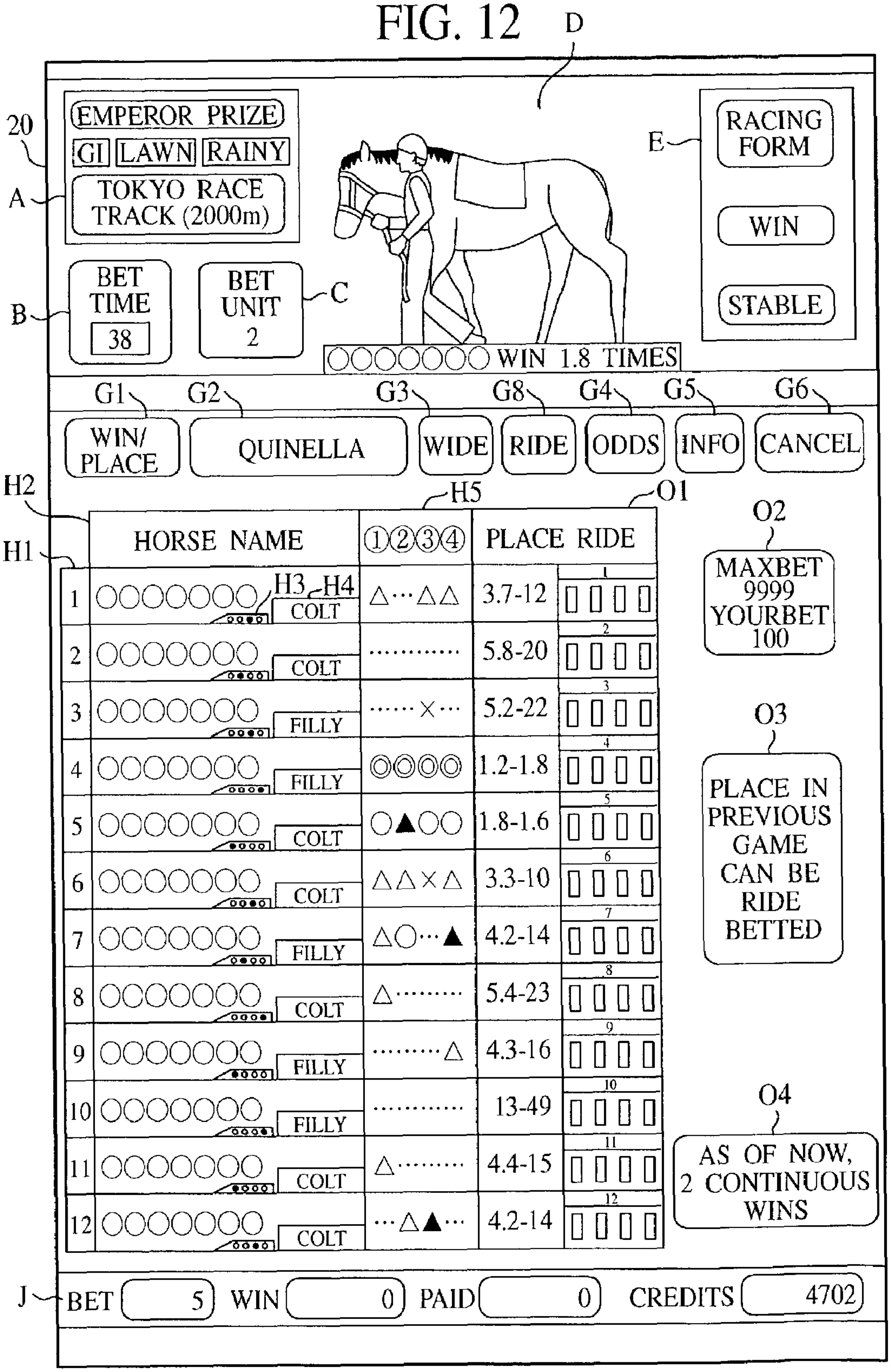
FIG. 12 is a view of an information image, when a place ride bet is made, displayed on the respective displays of the horse race game devices according to the embodiment of the present invention.

Place ride bet as one example of the bet control method for the horse race game device according to the present embodiment will be explained with reference to FIG. 12. FIG. 12 is a view of an information image 20 presented on the display 6 of the satellite 5 when the place ride bet is made.

In the place ride bet, when a place was hit in an immediately previous game, bets can be made with a coin number got by the place hit as a maximum betted coin number. Conventionally a maximum betted coin number has been always constant. The place betting tickets have high hit probability but uninterestingly have low allotments. A maximum betted coin number is added in continuous wins, which additionally makes the game interesting.

It is possible to bet a normal betted coin number added to an obtained coin number.

At an upper central part of the information image 20, a ride button G8 is arranged in addition to a win/place indication button G1, a quinella/bracket quinella indication button G2, a quinella place indication button G3, an odds indication button G4, an information indication button G5 and a cancel button G6.

By using the speculation indication region H6, the odds indication region H7 and the condition indication region H8 in the race detailed information indication region of the initial information display 20 shown in FIG. 8, indications are made for the place ride bets.

On the right side of the speculation indication region H5, a place ride indication region O1 is provided. In the place ride indication region O1, odds and allotments are indicated on the left side, and betted coin numbers are indicated on the right side. The betted coin number region allows for 4 placements for possible large coin numbers of bets.

At an upper right side of the place ride indication region O1, a maximum betted coin number indication region O2 is provided. A message indication region O3 is provided at the middle right side. A continuous wins indication region O4 is provided at a lower right side. In the maximum betted coin number indication region O2, a current maximum betted coin number (9999 coins) and a betted coin number (100 coins) of a game player are indicated. In the message indication region O3, "Place in the previous game can be ride betted" is indicated. In the continuous win indication region O4, a current continuous win number (2 continuous wins) is indicated.

Figure 13:
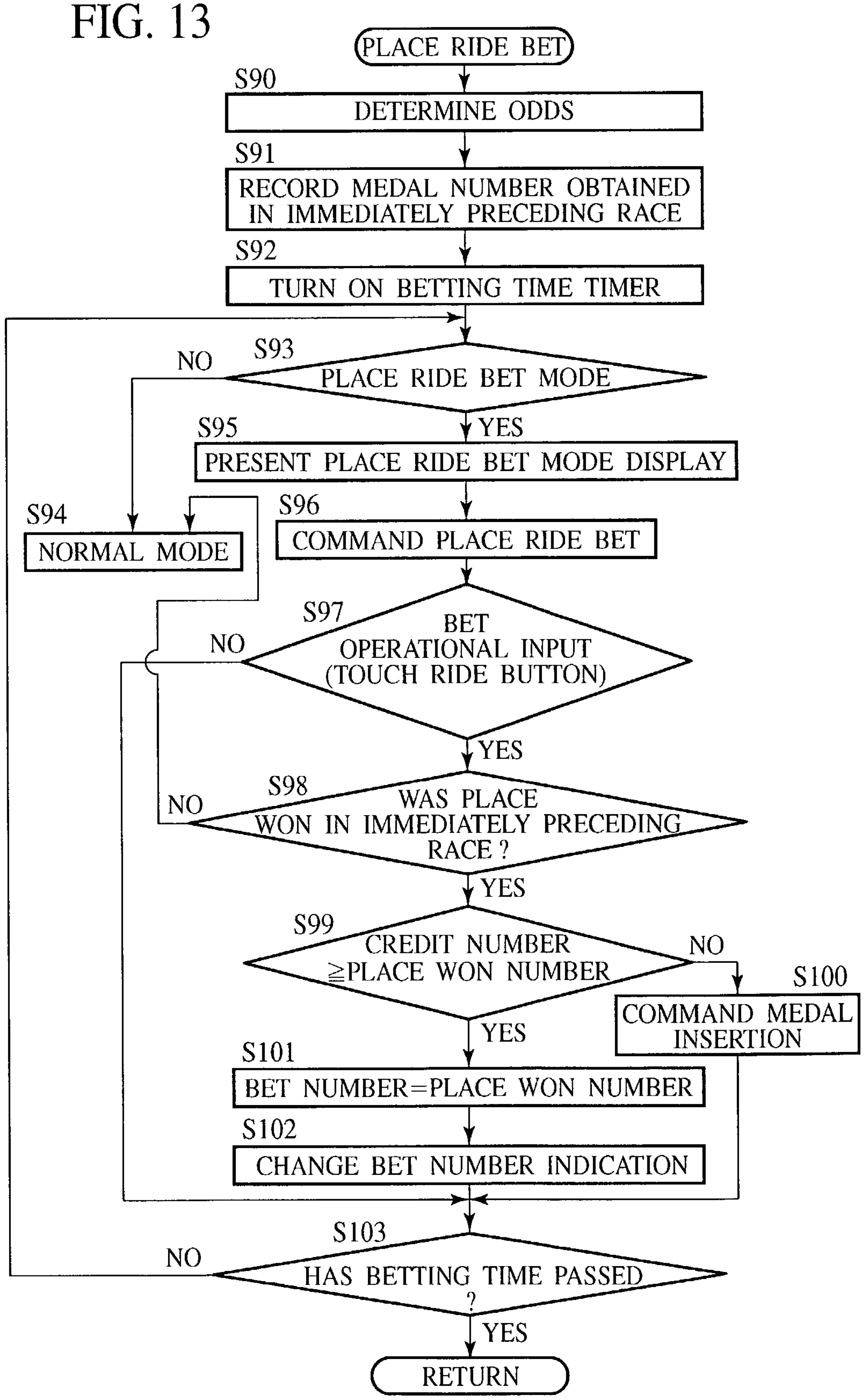
FIG. 13 is a flow chart of the bet control method for the place ride bet mode.

The bet control method for the place ride bet according to the present example will be detailed with reference to the flow chart of FIG. 13.

First, a prescribed computation is made to determine odds for a race to be held (Step S90). Subsequently, a coin number got by a place win in an immediately preceding race is recorded (Step S91).

Then, a betting time timer with a prescribed betting time set is turned on to start betting (Step S92).

Then, a player determines whether or not he will select the place ride bet mode (Step S93). When the player does not select the place ride bet mode, the normal mode takes place (Step S94).

In the place ride bet mode, a place ride bet mode display as shown in FIG. 12 is presented (Step S95). A ride button G8 is indicated in the place ride bet mode display. Then, the player bets on a pace in the next race (Step S96)

Next, a bet operational input by the player is waited for (Step S97). The player touches the ride button G8 to make the bet operational input. When the bet operational input is made, Step S103 follows.

When the bet operational input is made, it is judged whether or not the player has won the pace in the immediately preceding race (Step S98). When the player has not won in the immediately preceding race, the normal mode forcedly follows (Step S94).

Then, it is checked whether or not a place ride bet can be made; it is judged whether or not a coin number of the credit owned by the player is above a coin number won by the place (Step S99). When the coin number of the credit owned by the player is short, the player is commanded to additionally insert coins (Step S100).

When the coin number of the credit owned by the player is sufficient, a betted coin number is set to be a coin number obtained by the place win (Step S101) to change a betted coin number indication (Step S102).

Then, it is judged whether or not the prescribed betting time has passed (Step S103). When the betting time has passed, Step S95 follows.

The pace ride bet has, as described above, high probability of winning place race tickets, but uninterestingly the odds have been low. A maximum betted coin number is added when a place is won, whereby the place bets can be made more interesting.

In the present example, a maximum betted coin number is added for a place race ticket. However, for win race tickets, quinella race tickets and race tickets of the other kinds, a coin number got in an immediately preceding race may be added as the maximum betted coin number. It is also possible that the maximum betted coin number is larger when a succession of victories are gained.

[Modification of the Embodiment]

The present invention is not limited to the above-described embodiment and can cover other various modifications.

For example, in the above-described embodiment, images of racehorses as running objects are displayed, but models of racehorses as running objects may race.

In the above-described embodiment, the present invention is applied to the horse race game. However, the present invention is not essentially applied to the horse race game and is applicable to other race games and the general games. For example, the present invention is applicable to bicycle races, the running objects of which are bicycles, motorboat races, the running objects of which are motorboats, and games in which virtual lives as running objects race.

In the present embodiment, the present invention is applied to a coin game device using coins but is applicable to game devices using currents, which function as distribution means and payment means. The present invention is also applicable to game devices using virtual currents other than coins.

What is claimed is:

1. A bet control method executable on a game apparatus on which a simulated race is performed with a plurality of racing objects, on which a game player bets at a terminal connected to said game apparatus before starting the simulated race and the game player obtains a share based on a result of the race, the bet control method comprising the steps of:

(a) displaying on a monitor display of the terminal a set of first buttons configured to allow the game player to select various imitated racing forms each of which is configured to provide a set of recommendable buys different from one another for a race to start on said game apparatus;

(b) displaying one of said imitated racing forms on the monitor display in response to a selection operation to one of said first buttons so as to indicate the following items together on one page of the selected racing form:

(1) various information relating at least one of said racing objects selected by the game player for the imitated race to start;

(2) said set of recommendable buys with their odds prepared for the selected racing form, each of said recommendable buys displayed on the page including a finish place combination of a numerical symbol indicative of said one of the racing objects and another numerical symbol indicative of another of the racing objects; and (3) a second button configured to select, at one selection operation to the second button, all of the recommendable buys indicated on the page of the selected racing form;

(c) calculating, in response to the selection operation to said second button, a bet amount required to fix the selection of all of said recommendable buys indicated on the page of the selected racing form;

(d) judging whether or not the current credit is above the required amount calculated in step (c);

(e) when the current credit amount is short, displaying a command information for depositing an additional credit on the display;

(f) when the current credit amount is sufficient for the required bet amount calculated in step (c), fixing the buys selected by the gamer player and subtracting the amount from the current credit amount; and (g) starting said simulated race on the game apparatus after said betting has been completed.

2. A bet control method executable on a game apparatus on which a simulated race is performed with a plurality of racing objects, on which a game player bets at a terminal connected to said game apparatus before starting the simulated race and the game player obtains a share based on a result of the race, the bet control method comprising the steps of:

(a) displaying on a monitor display of the terminal a set of first buttons configured to allow game player to select various imitated racing forms each of which is configured to provide a set of recommendable buys different from one another for a race to start on said game apparatus;

(b) displaying on of said imitated racing forms on the monitor display in response to a selection operation to one of said set first buttons so as to indicate the following items together on one page of the selected racing form:

(1) various information relating at least one of said racing objects selected by the game player for the imitated race to start;

(2) said set of recommendable buys with their odds prepared for the selected racing form, each of said recommendable buys displayed on the page including a finish place combination of a numerical symbol indicative of said one of the racing objects and another numerical symbol indicative of another of the racing objects; and (3) a second button configured to select, at one selection operation to the second button, all of the recommendable buys indicated on the page of the selected racing form;

(4) an indication region including a set of third buttons at which the game player is allowed to set a target bet amount;

(c) allowing the game player to set a target bet amount at said indicating region;

(d) calculating, in response to the selection operation to said second button, a bet amount required to fix the selection of all of said recommendable buys indicated on said selected racing form;

(e) judging whether or not the current credit amount is above the bet amount calculated in step (d);

(f) when the current credit amount is short, displaying a command information for depositing an additional credit on the display, (g) when the current credit amount is sufficient for the required bet amount calculated in step (c), fixing the buys selected by the game player and subtracting the betted amount from the current credit amount; and (h) starting said simulated race on the game apparatus after said bet amount is determined.

3. A control method executable on a game apparatus on which a simulated race is performed with a plurality of racing objects, on which a game player bets for the simulated race at a terminal connected to said game apparatus before starting the simulated race and the game player obtains a share based on a result of the race, the control method comprising the steps of:

(a) displaying on a monitor display of the terminal a set of first buttons configured to allow the game player to select various imitated racing forms each of which is configured to provide a plurality of recommendable buys different from one another for a race to start on said game apparatus;

(b) displaying one of the imitated racing forms on the monitor display in response to a selection operation to one of said first buttons so as to indicate the following items on one page of the selected racing form:

(1) various information relating at least one of said racing objects selected by the game player for the imitated race to start;

(2) a table listing said plurality of recommendable buys with the respective odds thereto prepared for the selected race form, each of said recommendable buys listed on the table including a finish place combination of a numerical symbol indicative of said one of the racing objects and another numerical symbol indicative of another of the racing objects; and (3) a second button configured to select, at one selection operation to the second button, all of the recommendable buys listed on the table of the selected racing form;

(c) calculating, in response to the selection operation to said second button, a bet amount required to fix the selection of all of said recommendable buys listed on the table of said selected racing form;

(d) fixing the selected recommendable buys with respective bet amount thereto when the bet amount calculated in step (c) is within the current credit deposited by the game player; and (e) starting said simulated race on the game apparatus after the betting has been completed.

4. A control method executable on a game apparatus on which a simulated race is performed with a plurality of racing objects, on which a game player bets for the simulated race at a terminal connected to said game apparatus before starting the simulated race and the game player obtains a share, based on a result of the race, the control method comprising the steps of:

(a) displaying on a monitor display of the terminal a set of first buttons configured to allow the game player to select one or more of said various imitated racing forms each of which is configured to provide a plurality of recommendable buys different from one another for a race to start on said game apparatus;

displaying one of said imitated racing forms on the monitor display in response to a selection operation to one of said first buttons so as to indicate the following items on one page of the selected racing form:

(1) various information relating at least one of said racing objects selected by the game player for the imitated race to start;

(2) a table listing said plurality of recommendable buys with the respective odds there to of prepared for the selected racing form, each of said recommendable buys displayed on the page including a finish place combination of a numerical symbol indicative of said one of the racing objects and another numerical symbol indicative of another of the racing objects;

(3) a second button configured to select, at one selection operation to the second button, all of the recommended buys listed on the table of the selected racing form; and (4) an indication region including a set of third buttons at which the game player is allowed to set a target bet amount;

(d) calculating, in response to the selection operation to said second button, a bet amount required to fix the section of all of said recommendable buys listed on the table of said selected racing form;

(f) fixing the selected recommendable buys with the respective bet amounts thereto when the bet amount calculated in step (c) is within the current credit deposited by the game player; and (g) starting the simulation race on said game apparatus after the betting is completed.

5. A control method executable on a game apparatus on which a simulated race is performed with a plurality of racing objects, on which a game player bets for the simulated race at a terminal connected to said game apparatus before starting the simulated race and the game player obtains a share based on a result of the race, the method comprising the steps of:

(a) displaying, at a satellite connected to said game apparatus, a set of first active indications configured to allow the game player to select various imitated racing forms each of which is configured to provide a plurality of recommendable buys different from one another for a race to start on said game apparatus;

(b) displaying, in response to a selection manipulation by the game player on one of said first active indications, one of the racing forms in correspondence to the selected first active indication so as to indicate the following items:

(1) a table listing of plural recommendable speculations, and odds thereto, of possible racing results for the race by the racing objects to start before starting the race on the game apparatus, wherein each of said plural recommendable speculations listed on the table is configured to include a finish place combination of a numerical symbol indicative of one of the racing objects selected by the game player and another numerical symbol indicative of another of the racing objects, wherein a minimum bet unit is set to the respective recommendable speculations; and (2) a second active indication configured to select, at one selection operation to the second active indication, all of said plural recommendable speculations listed on the table of the selected racing form;

(c) calculating, in response to the selection operation to said second active indication, a bet amount required to fix the selection of all of the recommendable speculations listed on the table of the selected racing form based on the number of the selected speculations and the minimum bet unit set to the respective selected speculations;

(d) fixing the selection of the speculations when the bet amount calculated in step (c) is within the current credit deposited by the game player;

(e) starting the race with the racing objects; and (f) paying out a share calculated for any selected speculation which the player has won, if any.

6. The method according to claim 5, wherein said game apparatus comprises a central controlling means and a display monitor on which scenes of races virtually performed by the plurality of racing objects are displayed under the control of the central controlling means.

7. The method according to claim 5, wherein the page displayed in step (b) is further indicated with (3) an indication region at which the game player is allowed to set a target bet amount, and wherein the calculation of the bet amount in step (c) is performed within the target bet amount.

8. The method according to claim 5, wherein the respective recommendable speculations are configured to allow the game player to modify the respective bet unit amounts thereto.

* * * * *